United States Patent
Lee

(10) Patent No.: US 7,339,645 B2
(45) Date of Patent: Mar. 4, 2008

(54) IN-PLANE SWITCHING MODE LIQUID CRYSTAL DISPLAY DEVICE INCLUDING FIELD GENERATING ELECTRODES HAVING A CURVED SHAPE AND METHOD OF FABRICATING THE SAME

(75) Inventor: Yun-Bok Lee, Seoul (KR)

(73) Assignee: LG.Philips LCD. Co., Ltd., Seoul (KR)

( * ) Notice: Subject to any disclaimer, the term of this patent is extended or adjusted under 35 U.S.C. 154(b) by 161 days.

(21) Appl. No.: 10/824,598

(22) Filed: Apr. 15, 2004

(65) Prior Publication Data

US 2005/0128405 A1 Jun. 16, 2005

(30) Foreign Application Priority Data

Dec. 11, 2003 (KR) .................. 10-2003-0090361

(51) Int. Cl.
*G02F 1/1343* (2006.01)
(52) U.S. Cl. ..................... 349/141; 349/38
(58) Field of Classification Search ............... 349/99, 349/123, 126, 141, 38
See application file for complete search history.

(56) References Cited

U.S. PATENT DOCUMENTS

| | | | | |
|---|---|---|---|---|
| 4,609,255 A | * | 9/1986 | Leenhouts et al. | 349/103 |
| 5,069,813 A | | 12/1991 | Patel | 252/299.01 |
| 5,406,397 A | * | 4/1995 | Kodera et al. | 349/126 |
| 5,434,687 A | * | 7/1995 | Kawata et al. | 349/96 |
| 5,610,743 A | | 3/1997 | Tsai | 349/124 |
| 5,688,615 A | * | 11/1997 | Mrotek et al. | 429/210 |
| 5,879,497 A | * | 3/1999 | Nakahara et al. | 156/99 |
| 5,977,562 A | * | 11/1999 | Hirakata et al. | 257/72 |
| 6,078,375 A | * | 6/2000 | Matsumoto et al. | 349/123 |
| 6,122,032 A | * | 9/2000 | Mihara et al. | 349/155 |
| 6,191,881 B1 | * | 2/2001 | Tajima | 359/254 |
| 6,243,154 B1 | * | 6/2001 | You et al. | 349/141 |
| 6,313,897 B1 | * | 11/2001 | Murayama et al. | 349/126 |
| 6,512,563 B1 | * | 1/2003 | Tajima | 349/123 |
| 2003/0168055 A1 | | 9/2003 | Chae | |

FOREIGN PATENT DOCUMENTS

| | | |
|---|---|---|
| JP | 09-105908 | 4/1997 |
| JP | 09-325328 | * 12/1997 |
| JP | 9-325328 A | 12/1997 |
| JP | 9-325340 | 12/1997 |
| JP | 9-325450 | 12/1997 |
| JP | 2001-154214 | 6/2001 |
| JP | 2002-169183 | 6/2002 |
| JP | 2003-015146 | 1/2003 |
| JP | 2003-131250 | 5/2003 |
| KR | 1999-0058889 | 7/1999 |
| KR | 1020030073272 | 9/2003 |
| WO | WO 03/012536 A1 | 2/2003 |

* cited by examiner

*Primary Examiner*—David Nelms
*Assistant Examiner*—Phu Vu
(74) *Attorney, Agent, or Firm*—McKenna Long & Aldridge LLP

(57) ABSTRACT

A method of fabricating an in-plane switching mode liquid crystal display device includes: forming array elements on a first substrate, the array elements including field-generating electrodes having a curved shape; rubbing one of the first substrate and a second substrate in one direction, which can be any direction; and forming a liquid crystal layer between the first substrate and a second substrate such that at least a portion of the liquid crystal is oriented in the one direction.

12 Claims, 7 Drawing Sheets

IN-PLANE SWITCHING MODE LIQUID CRYSTAL DISPLAY DEVICE INCLUDING FIELD GENERATING ELECTRODES HAVING A CURVED SHAPE AND METHOD OF FABRICATING THE SAME

This application claims the benefit of Korean Patent Application No. 2003-090361, filed on Dec. 11, 2003, which is hereby incorporated by reference as if fully set forth herein.

BACKGROUND OF THE INVENTION

1. Field of the Invention

The present invention relates to a liquid crystal display device. More particularly, it relates to an in-plane switching mode liquid crystal display (IPS-LCD) device and a fabricating method thereof.

2. Discussion of the Related Art

Liquid crystal display (LCD) devices are being developed as the next generation of display devices because of their characteristics of light weight, thin profile, and low power consumption. In general, an LCD device is a non-emissive display device that displays images by making use of a refractive index difference through utilizing optical anisotropy properties of a liquid crystal material interposed between an array substrate and a color filter substrate. Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

FIG. 1 is a perspective view of a liquid crystal display device according to the related art. As shown in FIG. 1, an upper substrate 10 and a lower substrate 30 are spaced apart from and face each other, and a liquid crystal layer 50 is interposed therebetween. A plurality of gate lines 32 are formed on the inner surface of the lower substrate 32 and a plurality of data lines 34 cross the plurality of gate lines 32. A thin film transistor (TFT) "T" is connected to the gate line 32 and the data line 34. A pixel region "P" is defined by the crossing gate line 32, data line 34 and pixel electrode 46. Although not shown in FIG. 1, the TFT "T" includes a gate electrode that receives a gate voltage is applied, source and drain electrodes for passing a data voltage through the pixel electrode 46, and a channel region that is controlled by the gate voltage.

A color filter layer 12 and a common electrode 16 are sequentially formed on inner surface of the upper substrate 10. The color filter layer 12 transmits light only having a specific wavelength band. Although not shown in FIG. 1, a black matrix is formed on the color filter layer 12. The black matrix prevents light from passing through that is not in the specific wavelength band.

An upper polarizing plate 52 and a lower polarizing plate 54 are disposed outside the upper substrate 10 and the lower substrate 30, respectively. The upper polarizing plate 52 and the lower polarizing plate 54 transmit light that only has an optical axis parallel to the polarization axis of the respective polarizing plate. A backlight unit can be disposed below the lower polarizing plate 54, as shown in FIG. 1.

The liquid crystal display (LCD) device is fabricated through a liquid crystal cell process. In the liquid crystal cell process, a liquid crystal layer is formed between an array substrate and a color filter substrate. The array substrate has a switching element and a pixel electrode while the color filter substrate has a color filter layer and a common electrode. As compared with processes for the array substrate and the color filter substrate, a fabrication step for the forming the array substrate is seldom used to form the color filter substrate and vice versa. A liquid crystal panel, which is a basic element of an LCD device, is completed through a liquid crystal cell process that brings together the array substrate and the color filter substrate. The liquid crystal cell process may be divided into an orientation treatment step for providing orientation of the liquid crystal layer, a cell gap formation step, a cell-cutting step and a liquid crystal injection step.

FIG. 2 is a plane view showing an orientation treatment process for a twisted nematic mode liquid crystal display device according to the related art. As shown in FIG. 2, a mother glass 60 includes a cell region "II" where one of array elements and color filters is formed. Since a rubbing direction determines a main viewing angle in a twisted nematic (TN) mode LCD device, the upper substrate and the lower substrate are generally rubbed along 45° and 135° directions "R1" and "R2, " respectively, which cross each other along the diagonal direction of an LCD panel. In other words, since a rubbing process is performed along the diagonal direction of the mother glass 60, a rubbing roll 62 having a length "L2" corresponding to the diagonal length "L1" of the mother glass 60 is necessary. Especially for a large area mother glass, however, there are many problems in obtaining and using a rubbing roll having a length corresponding to the diagonal length of the mother glass.

In a TN mode LCD device, since a rubbing direction determines a viewing angle property of the LCD device, the rubbing direction is fixed to a specific direction. As a result, the rubbing direction may not be freely selected. In addition, since the rubbing process is performed along a diagonal direction of a mother glass, the cost of the rubbing process increases for a large area mother glass due to the need for a long rubbing roll and corresponding apparatus for a long rubbing roll.

In a conventional LCD device, since the pixel electrodes and common electrodes are positioned on the lower and upper substrates, respectively, a longitudinal electric field is induced perpendicularly between the lower and upper substrates. The conventional LCD devices have high transmittance and high aperture ratio. However, the conventional LCD devices using the longitudinal electric field have a drawback in that they have a very narrow viewing angle. In order to solve the problem of the narrow viewing angle, in-plane switching liquid crystal display (IPS-LCD) devices have been proposed.

The IPS-LCD devices typically include a lower substrate on which pixel electrodes and common electrodes are disposed. A liquid crystal layer is interposed between the upper and lower substrates. The upper substrate does not have any electrodes. A detailed explanation about the operational modes of a typical IPS-LCD panel will be provided while referring to FIG. 3.

FIG. 3 is a cross-sectional view of an IPS-LCD device according to the related art. As shown in FIG. 3, an upper substrate 80 and a lower substrate 70 are spaced apart from each other, and a liquid crystal layer 90 is interposed therebetween. The upper substrate 80 and the lower substrate 70 are often referred to as a color filter substrate and an array substrate, respectively. A common electrode 72 and a pixel electrode 74 are formed on the lower substrate 70. The common electrode 72 and pixel electrode 74 are positioned such that they are parallel to each other. On the surface of the upper substrate 80, a color filter layer (not shown) is commonly positioned to correspond to an area between the pixel electrode 74 and the common electrode 72 of the lower substrate 10.

A voltage applied across the common electrode 72 and the pixel electrode 74 produces an in-plane electric field "IF" through the liquid crystal molecules 92 of the a liquid crystal layer 90. The liquid crystal molecules 92 have a positive dielectric anisotropy, and thus it aligns parallel to the electric field "IF." In other words, when a voltage is applied across the common electrode 72 and the pixel electrode 74, i.e., "on state", a lateral electric field "IF," which is parallel to the surface of the lower substrate 70, forms between the common electrode 72 and the pixel electrode 74 on the lower substrate 70. Accordingly, the LC molecules 92 are arranged such that their longitudinal axes into coincidentally aligned with the electric field "IF." Since the LC molecules switch directions while maintaining their longitudinal axes in a plane perpendicular to the direct viewing direction of a display, in-plane switching provides a wide viewing angle for a display device. The viewing angles can range 80 to 85 degrees in up-and-down and left-and-right sides from a line vertical to the IPS-LCD panel, for example.

FIG. 4A is a plane view of an array substrate according to the related art IPS-LCD device, and FIG. 4B is a plane view of an array substrate according to another related art IPS-LCD device. The common electrode and the pixel electrode of FIG. 4A are in a stripe pattern, and the common electrode and the pixel electrode of FIG. 4B are in a zigzag pattern. As shown in FIGS. 4A and 4B, gate line "GL" is transversely arranged across the figures and data lines "DL" are disposed substantially perpendicular to the gate lines "GL." A common line "CL" is also transversely arranged across the figure in parallel with the gate line "GL" and is spaced apart from the gate line "GL." The gate line "GL," the common line "CL" and the data line "DL" define a pixel region "P" on the array substrate. A thin film transistor (TFT) "T" is disposed adjacent to a corner of the pixel region "P" near the crossing of the gate and data lines "GL" and "DL."

As shown in FIG. 4A, a plurality of common electrodes 94 extend from the common line "CL" and are parallel to the data line "DL." A plurality of pixel electrodes 96 are connected to a thin film transistor "T" and are parallel to the data line "DL." The plurality of pixel electrodes 96 alternate with the plurality of common electrode 94.

As shown in FIG. 4B, common electrodes 97 and pixel electrodes 98 are shaped in zigzag pattern to create multiple domains. FIG. 4A and FIG. 4B have similar features. Accordingly, some of detailed explanations with regard to FIG. 4B, especially previously explained with reference to FIG. 4A, will be omitted in order to prevent duplicate explanations.

In FIG. 4A and FIG. 4B, an area "AA" between the common electrodes 94 and 97 and the pixel electrodes 96 and 98 may be referred to as an aperture area. The liquid crystal molecules in the aperture area are re-arranged by an electric field. For convenience, the common electrodes 94 and 97 and the pixel electrodes 96 and 98 are represented by an in-plane electric field electrode "IFE."

In FIG. 4A, a rubbing process is performed along a first rubbing direction "RD1" that forms a certain angle with the in-plane electric field electrode "IFE." The reason for inclining rubbing direction with respect to the in-plane electric field electrode "IFE" is to obtain a fast re-arrangement of the liquid crystal molecules in correspondence with the electric field. For example, the first rubbing direction may have an angle of 60° to 85° with respect to the gate line "GL."

As shown in FIG. 4B, a second rubbing direction "RD2" inherently has an inclination with respect to the in-plane field electrode "IFE" because the in-plane field electrode "IFE" has a zigzag shape having an inclined angle. For example, the second rubbing direction "RD2" should be parallel with the data line "DL."

In the IPS-LCD device according to the related art, the rubbing direction is limited by the shape of electrodes generating an in-plane electric field. Accordingly, it is very difficult to reduce fabrication cost of a rubbing process by adopting optimum apparatus.

SUMMARY OF THE INVENTION

Accordingly, the present invention is directed to an IPS-LCD device that substantially obviates one or more of the problems due to limitations and disadvantages of the related art.

An advantage of the present invention is to provide an IPS-LCD device and a method of fabricating the IPS-LCD device where efficiency of a rubbing process is improved.

Another advantage of the present invention is to provide an IPS-LCD device and a method of fabricating the IPS-LCD device where an orientation direction for rubbing is not limited to a specific direction.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides a method of fabricating an in-plane switching mode liquid crystal display device includes: forming array elements on a first substrate, the array elements including field-generating electrodes having a curved shape; rubbing one of the first substrate and a second substrate in one direction, which can be any direction; and forming a liquid crystal layer between the first substrate and a second substrate such that at least a portion of the liquid crystal is oriented in the one direction.

In another aspect, an in-plane switching mode liquid crystal display device includes: first and second substrates facing and spaced apart from each other, wherein one of the first and second substrates is rubbed in one direction; array elements including field-generating electrodes having a curved shape formed on the first substrate; and a liquid crystal layer between the first substrate and the second substrate such that at least a portion of the liquid crystal is oriented in the one direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

DETAILED DESCRIPTION OF THE PREFERRED EMBODIMENTS

Reference will now be made in detail to a preferred embodiment of the present invention, examples of which are shown in the accompanying drawings. Wherever possible, similar reference numbers will be used throughout the drawings to refer to the same or similar parts.

Figure 1:
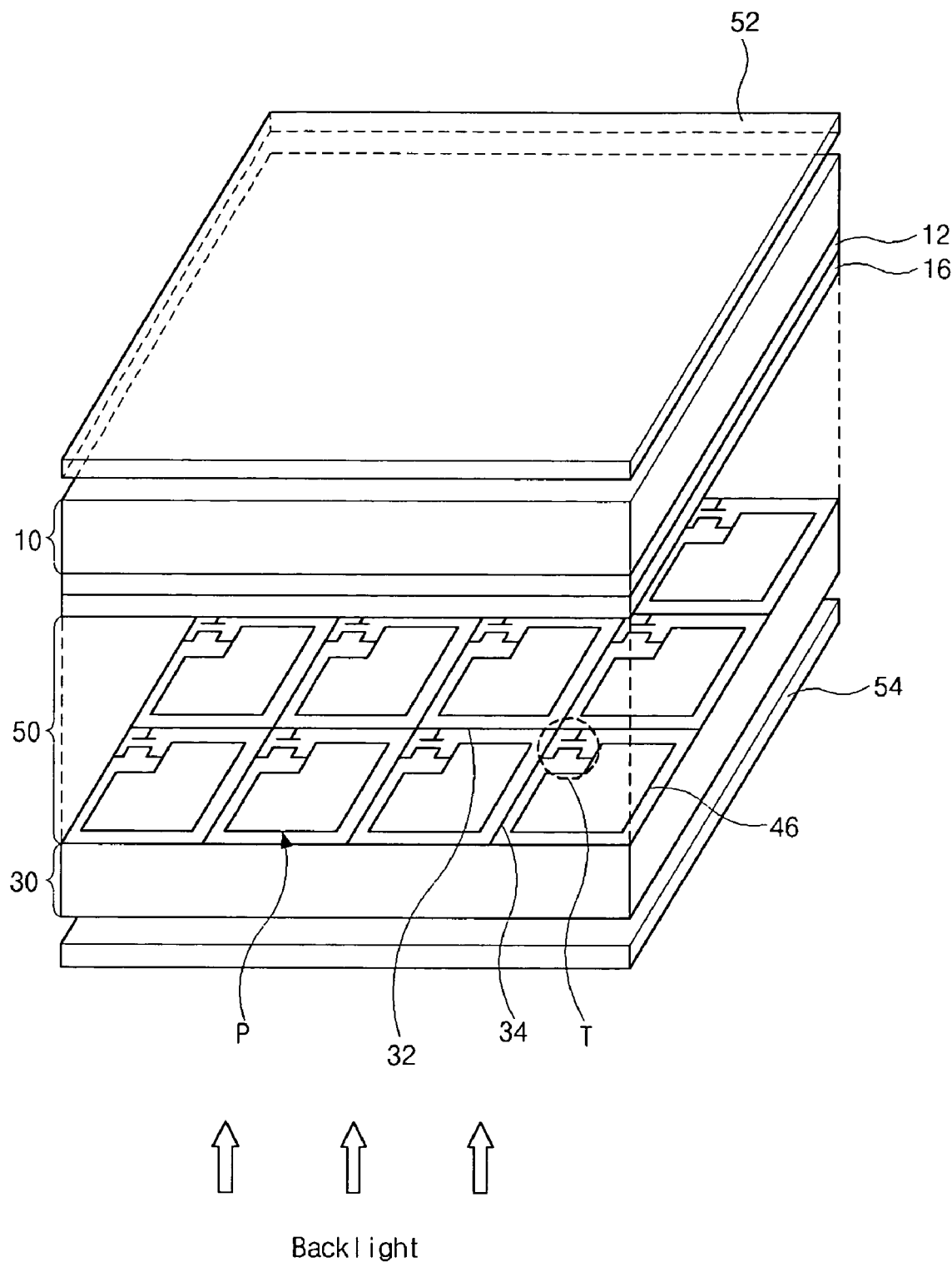
FIG. 1 is a perspective view of a liquid crystal display device according to the related art.
Figure 2:
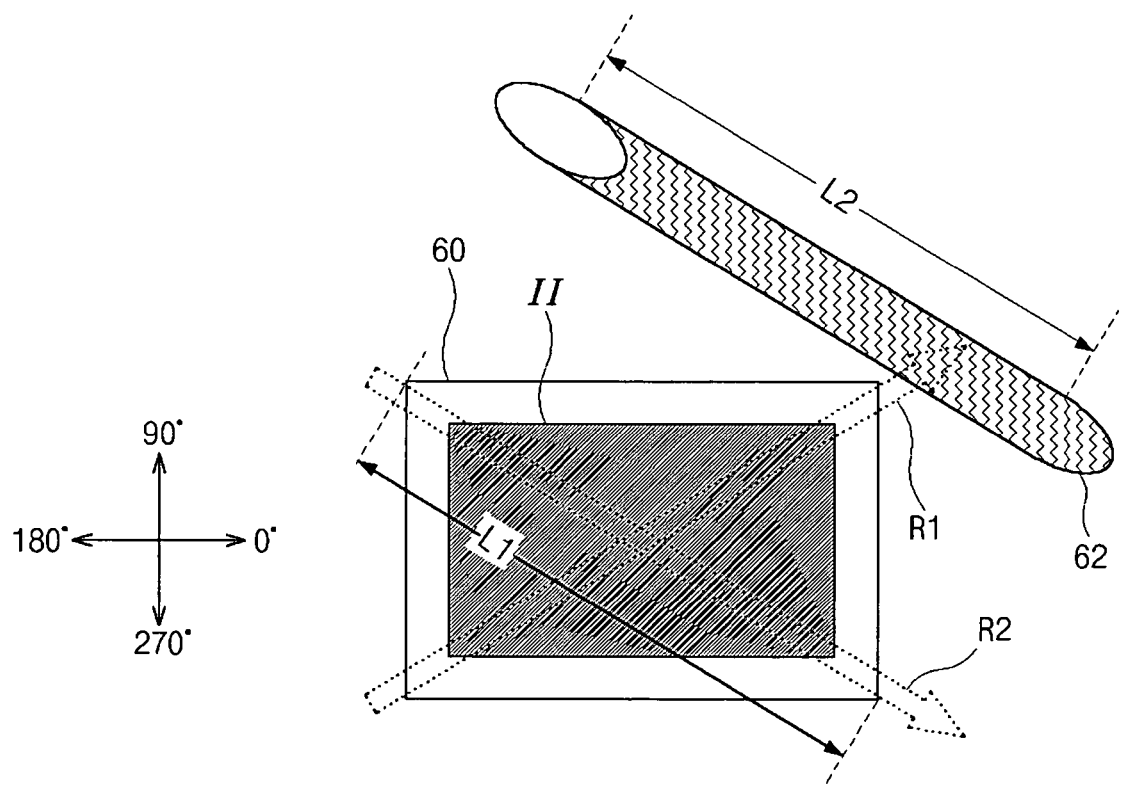
FIG. 2 is a plane view showing an orientation treatment process for a twisted nematic mode liquid crystal display device according to the related art.
Figure 3:
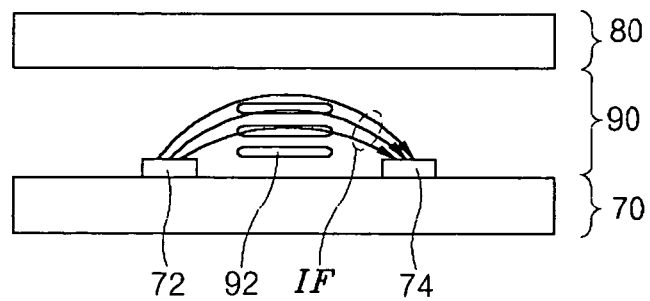
FIG. 3 is a cross-sectional view of an IPS-LCD device according to the related art.
Figure 4A:
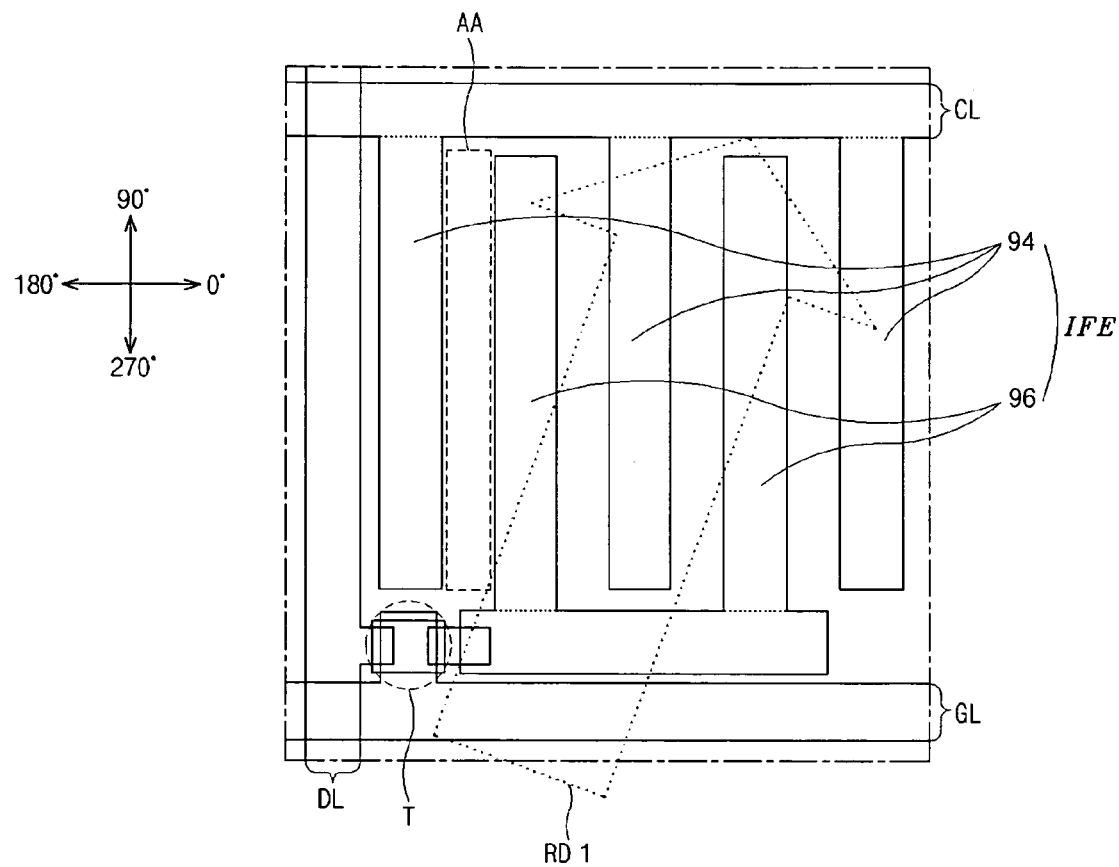
FIG. 4A is a plan view illustrating one pixel of an array substrate where straight pixel and common electrodes are disposed according to the related art IPS-LCD device.
Figure 4B:
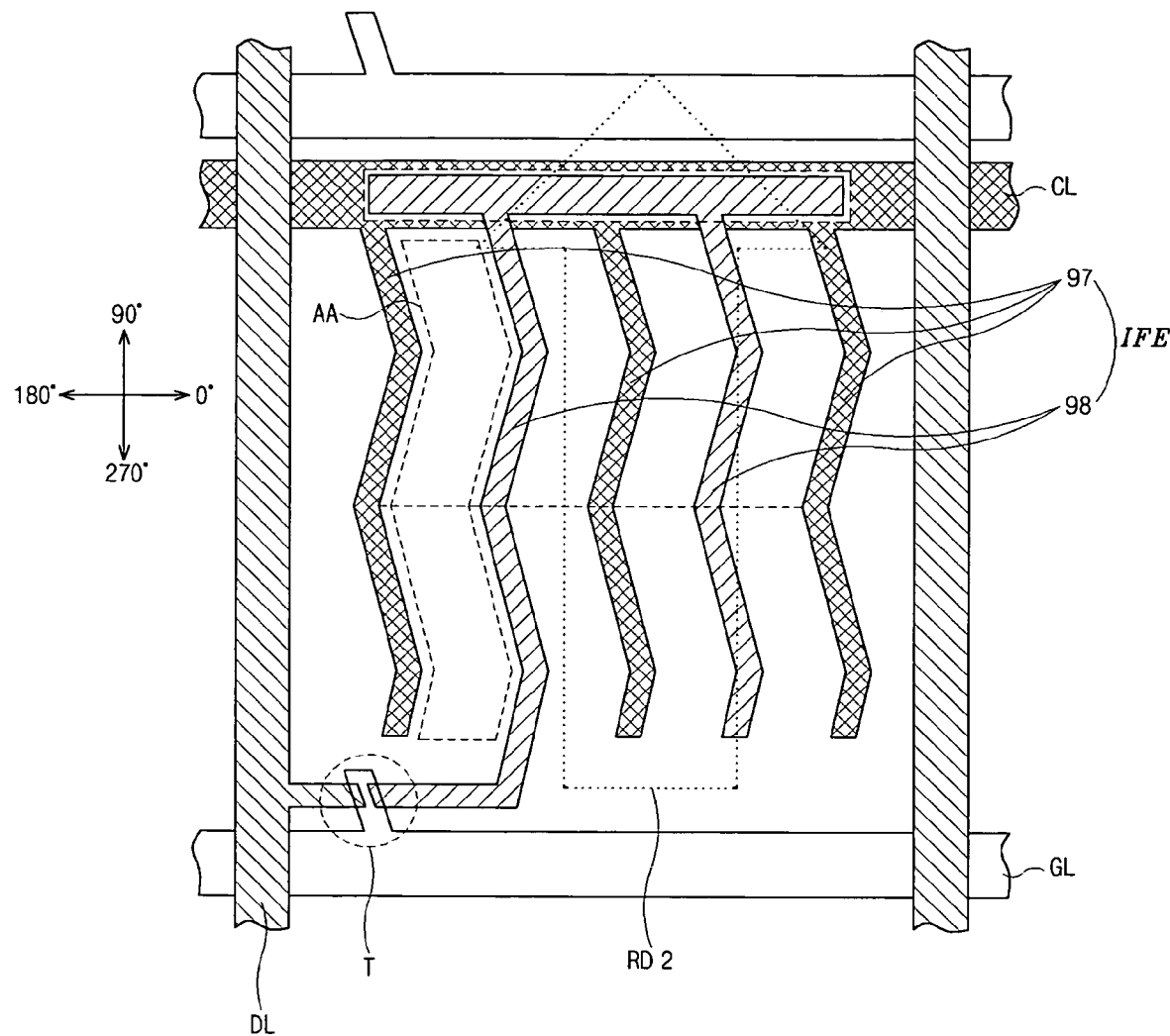
FIG. 4B is a plan view illustrating one pixel of an array substrate where zigzag pixel and common electrodes are disposed according to another related are IPS-LCD device.
Figure 5:
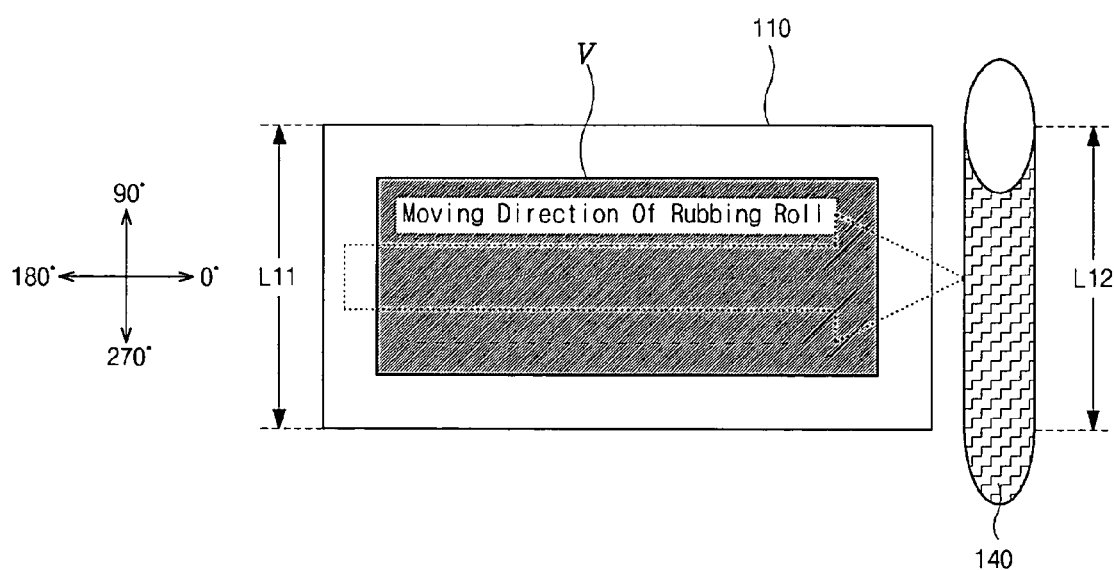
FIG. 5 is a plane view showing a rubbing process for an IPS-LCD device according to a first embodiment of the present invention.

FIG. 5 is a plane view showing a rubbing process for an IPS-LCD device according to a first embodiment of the present invention. As shown in FIG. 5, a mother glass 110 includes a cell region "V" corresponding to one liquid crystal panel after a subsequent process. Even though not shown in FIG. 5, array elements including field-generating electrodes of a circular shape are formed in the cell region "V."

In the related art IPS-LCD device, both a common electrode and a pixel electrode are formed on the same lower substrate. A liquid crystal layer is driven by an in-plane electric field generated between the common electrode and the pixel electrode. Thus, a rubbing direction is determined by the structure of field-generating electrodes, (i.e., the common electrode and the pixel electrode).

In the first embodiment of the present invention, however, since the field-generating electrodes have a circular shape, directors of the liquid crystal layer are the same in all directions. Accordingly, the rubbing direction is independent of the structure of the field-generating electrodes and may be freely determined. In other words, the degree of freedom for determining the rubbing direction is increased. To reduce cost of a rubbing apparatus, a rubbing process may be performed such that a moving direction of a rubbing roll 140 is parallel to a long side of a mother glass 110. In the rubbing process for an IPS-LCD device according to the present invention, the rubbing roll 140 may have a length "L12" corresponding to a length "L11" of a short side of the mother glass 110.

Figure 6:
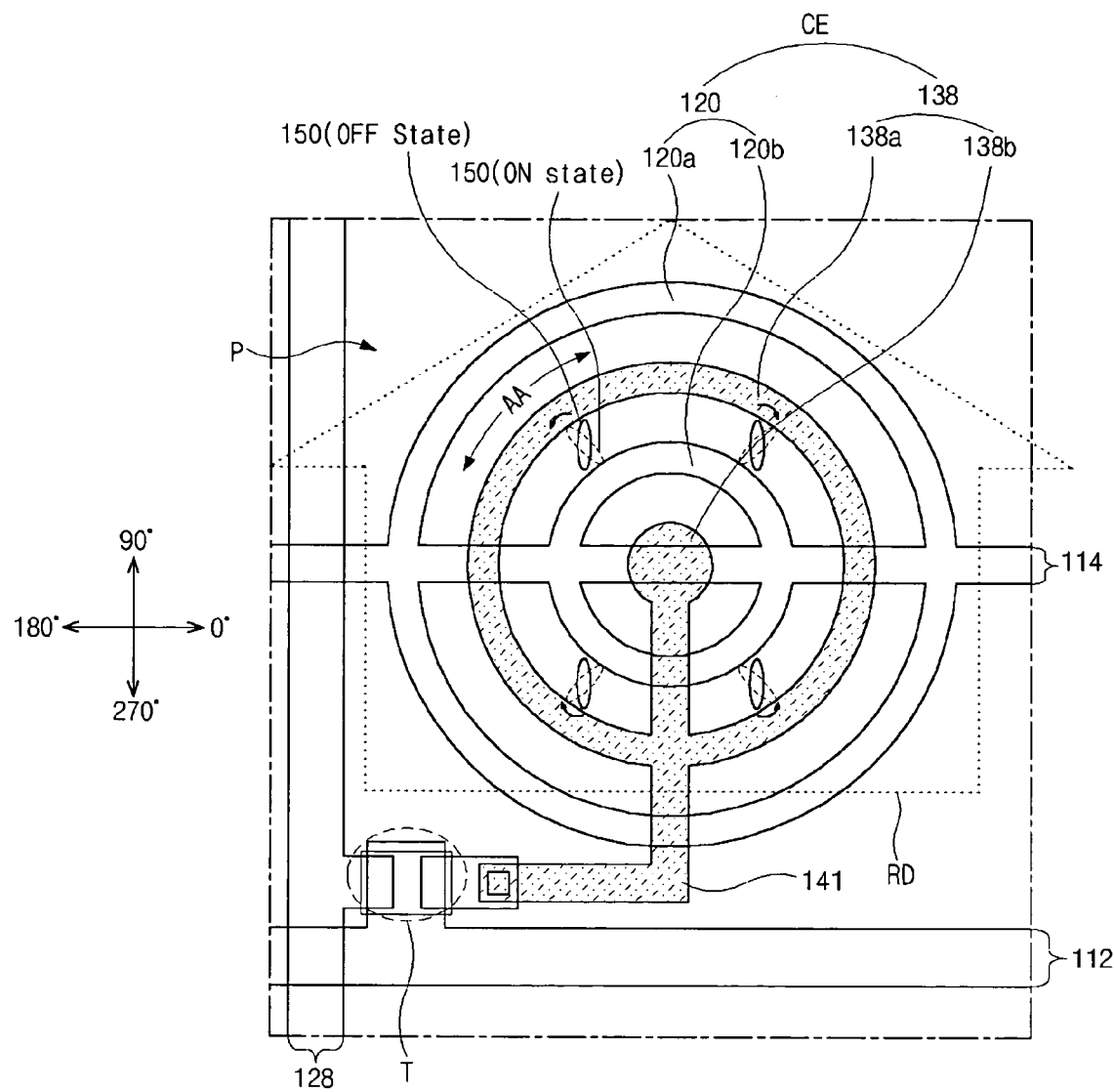
FIG. 6 is a plane view showing an operation of an IPS-LCD device according to a first embodiment of the present invention.

FIG. 6 is a plane view showing an operation of an IPS-LCD device according to a first embodiment of the present invention. As shown in FIG. 6, a gate line 112 is transversely arranged and a data line 128 is disposed substantially perpendicular to the gate line 112. A pair of gate and data lines 112 and 128 define a pixel region "P." A thin film transistor (TFT) "T" is disposed near each crossing of the gate and data lines 112 and 128, especially at a corner of the pixel region "P." A common line 114 is transversely formed in the middle portion of the pixel region "P" with perpendicularly crossing the data line 128. A common electrode 120 including first and second common electrode patterns 120a and 120b extends from the common line 114 and have a ring shape in the pixel region "P." A pixel electrode 138 including first and second pixel electrode patters 138a and 138b is spaced apart from the common electrode 120 and is connected to the TFT "T."

A space between the common electrode 120 and the pixel electrode 138 is defined as an aperture area "AA" and the aperture area "AA" has a ring shape due to the shapes of the common electrode 120 and the pixel electrode 138. In detail, the first common electrode pattern 120a surrounds a boundary portion of the pixel region "P." The second common electrode pattern 120b has a curved shape, such as a ring, and is disposed inside the first common electrode pattern 120a. The first pixel electrode pattern 138a has a curved shape, such as a ring, and is disposed between the first and second common electrode patterns 120a and 120b. The second pixel electrode pattern 138b has a discal shape and is disposed inside the second common electrode pattern 120b. The first and second pixel electrode patterns 138a and 138b are connected to the TFT "T" through a pixel connecting line 141.

The common electrode 120 and the pixel electrode 138 constitute field-generating electrodes "CE" that have a curved shape. Since the liquid crystal directors are the same along all directions in the aperture area "AA" between the field-generating electrodes "CE," a viewing angle is improved. As a result, an orientation direction may not be limited to a specific direction. For example, when a rubbing process is performed along a rubbing direction "RD," liquid crystal molecules 150 are initially arranged along the rubbing direction "RD" in absence of an applied voltage. If a voltage is applied, the liquid crystal molecules 150 in the aperture area "AA" are symmetrically re-arranged along a radial direction of the field-generating electrodes "CE." Therefore, the rubbing direction "RD" may be selected without considering the structure of the field-generating electrode "CE." In other words, the rubbing direction can be selected from any direction of 0° to 360° without limitations. Accordingly, liquid crystal molecules 150 will be aligned in correspondence with the rubbing direction of an adjacent substrate.

Figure 7:
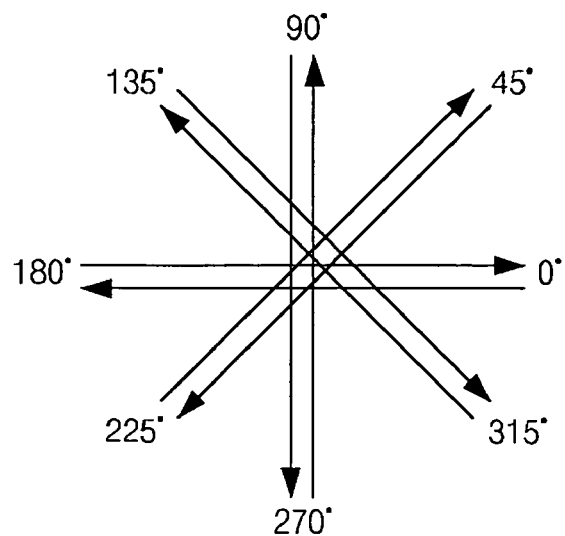
FIG. 7 is a view showing rubbing directions for an IPS-LCD device according to the first embodiment of the present invention.

If a rubbing direction for a substrate is determined by considering the polarization axes of polarizing plates, the rubbing direction may be selected from one of 0°, 45°, 90°, 135°, 180°, 225°, 270° and 315° directions with respect to the gate line, as shown in FIG. 7. For example, when an upper substrate is rubbed along 0° direction, the lower substrate is rubbed along 180° direction, an upper polarizing plate has a polarization axis of 0° direction and the lower polarizing plate has a polarization axis 90°.

In a multi-model on glass (MMG) method, large-sized liquid crystal cells and small-sized liquid crystal cells can be efficiently disposed on a mother glass. This method has been recently adopted to effectively utilize the entire area of a mother glass. A rubbing process for an IPS-LCD device using the MMG method will be illustrate with reference to FIG. 8.

Figure 8:
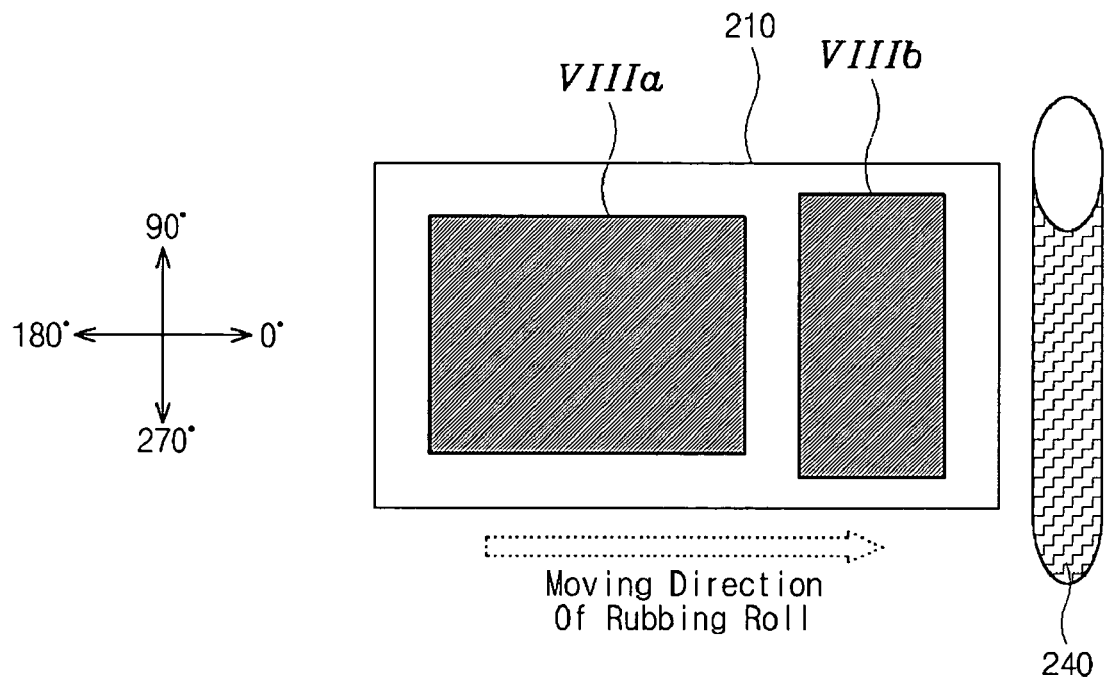
FIG. 8 is a plane view showing a rubbing process for an IPS-LCD device according to a second embodiment of the present invention.

FIG. 8 is a plane view showing a rubbing process for an IPS-LCD device according to a second embodiment of the present invention. The liquid crystal cell in FIG. 8 can be disposed on a mother glass using a multi-model on glass (MMG) method, for example. As shown in FIG. 8, a first cell region "VIIIa" having a first size and a second cell region "VIIb" having a second size smaller than the first size are disposed on a mother glass 210. Although not shown in FIG. 8, the array elements in the first and second cell regions "VIIIa" and "VIIIb" can include field-generating electrodes having a curved shape, such as a ring shape.

In the IPS-LCD device including the field-generating electrodes of a ring shape, since liquid crystal directors are the same in all directions having no concern with an orientation direction, efficiency of utilization of a mother glass 210 is maximized. For example, when first liquid crystal panels are disposed in the first cell region "VIIIa" such that a long side of the first liquid crystal panel is parallel to a long side of the mother glass 210, second liquid crystal panels can be disposed in the second cell region "VIIb" to minimize a dummy region of the mother glass 210.

In addition, a rubbing direction can be selected from any direction of 0° to 360° without considering the structure of the field-generating electrodes "CE." Accordingly, the rubbing process can be performed along a direction parallel to a long side of the mother glass 210. As a result, a length of the rubbing roll 240 may be effectively reduced to only correspond to the length of the short side of the mother glass 210.

After the rubbing process, an attachment process, a liquid crystal injection process and a cutting process may be performed to complete fabrication of an IPS-LCD device. Because of the use of field-generating electrodes having a curved shape, the rubbing of the rubbing process can be in any direction. Thus, the liquid crystal layer is positioned between the mother glass 210 and a second substrate has at least a portion of the liquid crystal oriented in the direction of the rubbing. Alternatively, an IPS-LCD device may include field-generating electrodes having an elliptical shape as the curved shape. Other alternatives, such as other curved shapes, can be used.

In an IPS-LCD according to the present invention, since field-generating electrodes have a circular shape, liquid crystal directors are the same in all directions so that there is no concern with an orientation direction. As a result, an orientation direction can be freely selected from all direction without limitations. Moreover, since a rubbing process can be performed along a direction parallel to a long side of a mother glass, a length of a rubbing roll is reduced and cost of a rubbing apparatus is reduced. For a multi-model on glass (MMG) method, since liquid crystal cells can be disposed without considering an orientation direction, efficiency of utilization of a mother glass increases and cost of a rubbing process is reduced.

It will be apparent to those skilled in the art that various modifications and variation can be made in an IPS-LCD device of the present invention without departing from the spirit or scope of the invention. Thus, it is intended that the present invention cover the modifications and variations of this invention provided they come within the scope of the appended claims and their equivalents.

What is claimed is:

1. A method of fabricating an in-plane switching mode liquid crystal display device, comprising:
   forming array elements on a first substrate, the array elements including field-generating electrodes having a curved shape;
   rubbing one of the first substrate and a second substrate in one direction, which can be any direction; and
   forming a liquid crystal layer between the first substrate and the second substrate such that at least a portion of the liquid crystal layer is oriented in the one direction,
   wherein the first and second substrates have a rectangular shape having a long side and a short side, and the liquid crystal layer is oriented by the rubbing using a rubbing roll,
   wherein the rubbing roll has a length corresponding to the short side,
   wherein the field-generating electrodes include a common electrode and a pixel electrode spaced apart from each other, and a space between the common electrode and the pixel electrode has a ring shape, and
   wherein the common electrode includes an outer common electrode pattern and an inner common electrode pattern, and wherein the pixel electrode includes a first pixel electrode pattern formed between the outer and inner common electrode patterns, a second pixel electrode pattern having a discal shape and located inside the inner common electrode pattern, and a pixel connecting line.

2. The method of claim 1, wherein the rubbing includes moving the rubbing roll along a direction parallel to the long side.

3. The method of claim 1, wherein the array elements include a gate line, a data line crossing the gate line and a thin film transistor connected to the gate line and the data line.

4. The method of claim 3, wherein the one direction is one of 0°, 45°, 90°, 135°, 180°, 225°, 270° and 315° directions with respect to the gate line.

5. The method of claim 1, wherein the first and second substrates include first and second cell regions having sizes different from each other and a dummy region, a plurality of first liquid crystal cells are formed in the first cell region and a plurality of second liquid crystal cells are formed in the second cell region such that the plurality of first liquid crystal cells and the plurality of second liquid crystal cells have a rectangular shape, wherein a longer side of each first liquid crystal cell is parallel to a first direction and a longer side of each second liquid crystal cell is parallel to one of the first direction and a second direction perpendicular to the first direction.

6. The method of claim 1, further comprising:
   forming a color filter layer on the second substrate;
   attaching the first and second substrates such that the array elements face the color filter layer; and
   cutting the attached first and second substrates.

7. An in-plane switching mode liquid crystal display device, comprising:
   first and second substrates facing and spaced apart from each other, wherein one of the first and second substrates is rubbed using a rubbing roller in one direction, which can be any direction:
   array elements including field-generating electrodes having a curved shape formed on the first substrate; and
   a liquid crystal layer between the first substrate and the second substrate such that at least a portion of the liquid crystal is oriented in the one direction
   wherein the first and second substrates include first and second cell regions having sizes different from each other and a dummy region, a plurality of first liquid crystal cells are formed in the first cell region and a plurality of second liquid crystal cells are formed in the second cell region such that the plurality of first liquid crystal cells and the plurality of second liquid crystal cells have a rectangular shape, wherein a longer side of each first liquid crystal cell is parallel to a first direction and a longer side of each second liquid crystal cell is parallel to one of the first direction and a second direction perpendicular to the first direction, wherein the rubbung roller has a length corresponding to the second direction, wherein the field-generating electrodes include a common electrode and a pixel electrode spaced apart from each other, and a space between the common electrode and the pixel electrode has a ring shape, and wherein the common electrode includes an outer electrode pattern and an inner common electrode pattern, and wherein the pixel electrode includes a first pixel electrode pattern formed between the outer and inner common electrode pattern, and a pixel connecting line.

8. The device of claim 7, wherein the array elements include a gate line, a data line crossing the gate line and a thin film transistor connected to the gate line and the data line.

9. The device of claim 8, wherein the one direction is one of 0°, 45°, 90°, 135°, 180°, 225°, 270° and 315° directions with respect to the gate line.

10. The device of claim 8, further comprising first and second polarizing plates outside the first and second substrates, respectively.

11. The device of claim 10, wherein a first polarization axis of the first polarizing plate is perpendicular to the one orientation direction and a second polarization axis of the second polarizing plate is parallel to the one orientation direction.

12. The device of claim 7, further comprising:

a color filter layer on the second substrate;

wherein the first and second substrates are attached such that the array elements face the color filter layer; and wherein the attached first and second substrates are cut.

\* \* \* \* \*